United States Patent

Voss

[11] Patent Number: 5,906,385
[45] Date of Patent: May 25, 1999

[54] ADJUSTABLE BICYCLE DROPOUT

[75] Inventor: Darrell W. Voss, Chehalis, Wash.

[73] Assignee: Klein Bicycle Corporation, Chehalis, Wash.

[21] Appl. No.: 08/715,320

[22] Filed: Sep. 17, 1996

[51] Int. Cl.[6] .................................................. B62K 19/22
[52] U.S. Cl. ........................ 280/288; 280/274; 280/281.1
[58] Field of Search ................................ 280/274, 281.1, 280/288; 180/218, 270, 277

[56] References Cited

U.S. PATENT DOCUMENTS

| 585,176 | 6/1897 | Bennett | 280/288 |
|---|---|---|---|
| 622,006 | 3/1899 | Jerome | 280/288 |
| 4,565,383 | 1/1986 | Isaac | 280/281.1 |
| 4,813,591 | 3/1989 | Mueller et al. | 280/288 |
| 5,292,143 | 3/1994 | Stauch et al. | 280/281.1 |
| 5,364,115 | 11/1994 | Klein et al. | 280/281.1 |

Primary Examiner—Daniel G. DePumpo
Attorney, Agent, or Firm—Jim Zegeer, Esq.

[57] ABSTRACT

A bicycle rear wheel dropout assembly comprising a wheel dropout body member having a wheel axle receiving slot, a surface for securement of the rear end of a bicycle chainstay, and a seatstay projection a pivot pin projecting laterally from the wheel side of said seatstay projection, the seatstay tube having a lower edge, and means permanently securing said seatstay tube on the projection with said lower edge in engagement with said pivot pin in a predetermined angular orientation for a given bicycle size. In a second embodiment the seatstay projection is spherically shaped and the lower edge of the seat tube has a pivot pin notch with the pivot pin seated in the notch.

9 Claims, 4 Drawing Sheets

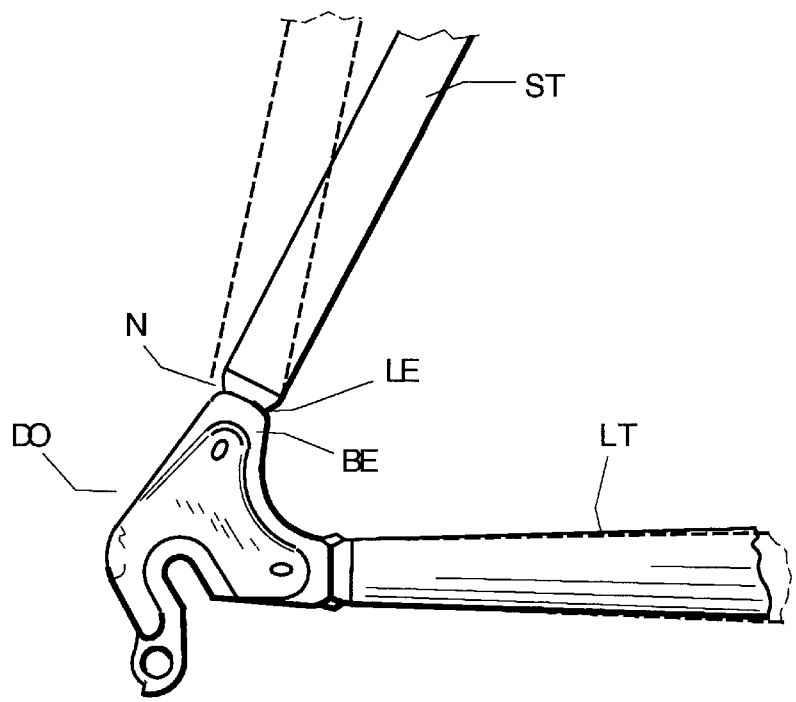
FIG. 1 (PRIOR ART)
FIG. 2
(PRIOR ART)
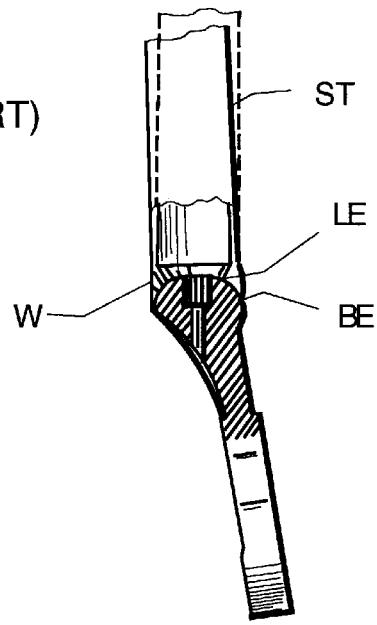

ADJUSTABLE BICYCLE DROPOUT

The present invention is directed to improvements in bicycle dropouts which improve manufacturing processes, lower costs and improve the quality, particularly in the alignment of seatstays and/or chainstays which enable a common dropout to be used for multiple bicycle frame sizes.

BACKGROUND AND BRIEF DESCRIPTION OF THE INVENTION

When attaching (welding, brazing, gluing, etc.) a seatstay and/or chainstay to a bicycle dropout, it is common to make one dropout for every frame size (seven average frame sizes and there can be special frame sizes). This is done to optimize weight, aesthetic appearance between seatstay and chainstay and dropout and manufacturability of each frame. Having many different dropouts is very costly since each dropout requires starting forms, forging dies and trim dies, as well as smaller production runs and more parts to inventory. A typical fixed design is shown in FIG. 3: the lower ends of the seatstay tube ST is snugly telescoped over annular stud projections P. The concept of adjustable dropouts has been around for many years. One such design is shown in Muller et al U.S. Pat. No. 4,813,591 from which FIGS. 1 and 2 hereof are taken. In this design, a ball element BE is formed on the dropout DO and a socket portion is shaped on the lower butt end L of the seize ST so that in effect a ball and socket universally adjustable joint is formed which can be welded in place at the desired angle for a given frame size. A similar arrangement is provided for the connecting the chainstay tube to the dropout.

This design reduces the contact area between tube end and dropout resulting in approximately 80 degree of entrapment, limiting the manufacturer to using the outside surface of the domed ends of the tube or the ends of the tube. This makes the fit-up for the assembler difficult to maintain accurate placement for fast high volume and high accuracy placement. Under normal doming operations the end surface is rough due to the swaging or pointing operation because the metal is being gathered and work hardened with some grain structure gathering more rapidly than others. When locating off of the end of the domed tube end, additional machining or forming operations may be required for truly accurate locating. In FIG. 15 of Mueller et al, it is clear that the side rotation of the tube drastically reduces the entrapment region and provides little side-to-side stability. On FIG. 10, there is approximately 80° of entrapment, again using only the end of the seatstay for location.

The object of the present invention is to provide an improved bicycle dropout system and, more particularly, an improved adjustable dropout which can accurately accommodate a wide variety bicycle frame sizes.

According to the present invention, a locating edge is formed in the lower end of the seatstay tube and a mating locating pin on a seatstay projection on the dropout. This will allow the seatstay tube to rotate fore and aft freely on the outside of the locating pin. The pin should be placed at a perpendicular angle to the centerline of the tube. The pin could be attached to the welding fixture rather than the dropout, providing essentially the same function while eliminating the pin on the dropout. This will assure accurate locating or positioning of the parts relative to each other thereby allowing for accurate and rapid positioning of the parts.

The locator pin does not necessarily need to be round. Since its purpose is to help locate the centerline of the part, the locator could actually be a triangular protrusion having one of the corners acting as the contact point. The purpose of this pin is to serve as a stop to keep the tube from slipping over center of the radius profile of the dropout, and thus does not need to be precisely in the center. If the locator pin is within proximity of the center, it will suffice due to the tolerances required and the ability of the assembler to maneuver the part into place. When using a formed tube, such as a rectangular tube, the pin serves as a stop as opposed to a locator. The actual location of the tube is carried out by the internal rectangular mating surfaces which will dictate the orientation of the tube. The pin will allow the tube to rotate only about the axis centered on the pin. On spherical ball style dropouts, there is no formed shape to control the tube placement, therefore a notch can be utilized to help speed up the assembler and accurately control for any unwanted rotation.

In a preferred embodiment, the dropout member has an integral rectangularly formed stay tube projection which provides approximately 170° of engagement on straight ID walls providing a positive fit on all sides. In a further embodiment the seat tube projection is generally spherically shaped and a pivot pin notch is formed in the lower edge of the seatstay tube, the entrapment of seatstay ID is approximately 170°. Moreover the present invention restricts unwanted rotation by allowing only fore an aft rotation about a centerline defined by the pin on the outside profile of a spherically shaped portion. When using pre-mitered, or pre-formed seatstays, locating of the part is critical to fit-up. (In this context the prior art discussed above require further fixturing in order to ensure a proper fit between the seatstays and the seat tube; and some seatstays require additional bending for tire clearance along with the pre-metered seize for fit-up between seize and seat tube thereby adding to the location problem.)

The present invention will locate the end of the seatstay tube using the internal diameter (ID) of the tube (straight or formed) to the dropout's outer surface or ball using a pin to prevent the seat stay from slipping over center. By notching the end of a straight (not formed) seatstay, the pin will act as a positive locator for the tube ensuring an accurate fit-up with the seat tube. This is not accomplished by the prior art. The dropout of the present invention can have approximately 170° of engagement which inherently provides a much more stable interface. The invention can accommodate brazing, welding or gluing.

DESCRIPTION OF THE DRAWINGS

The above and other objects, advantages and features of the invention will become more clear when considered with the following specification and accompanying drawings, wherein:

FIGS. 1 and 2 (prior art) illustrate a prior art adjustable dropout from U.S. Pat. No. 4,813,591.

DETAILED DESCRIPTION OF THE INVENTION

Figure 3:
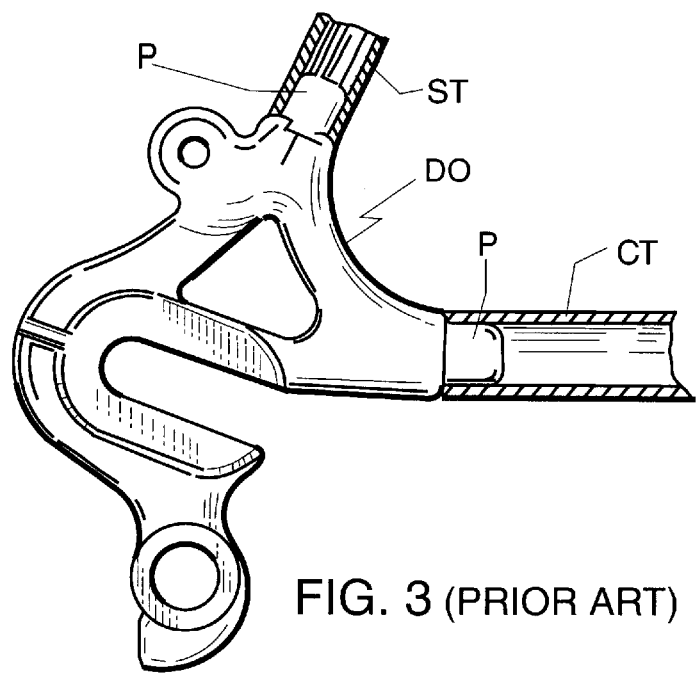
FIG. 3 illustrates a non-adjustable prior art dropout.
Figure 4:
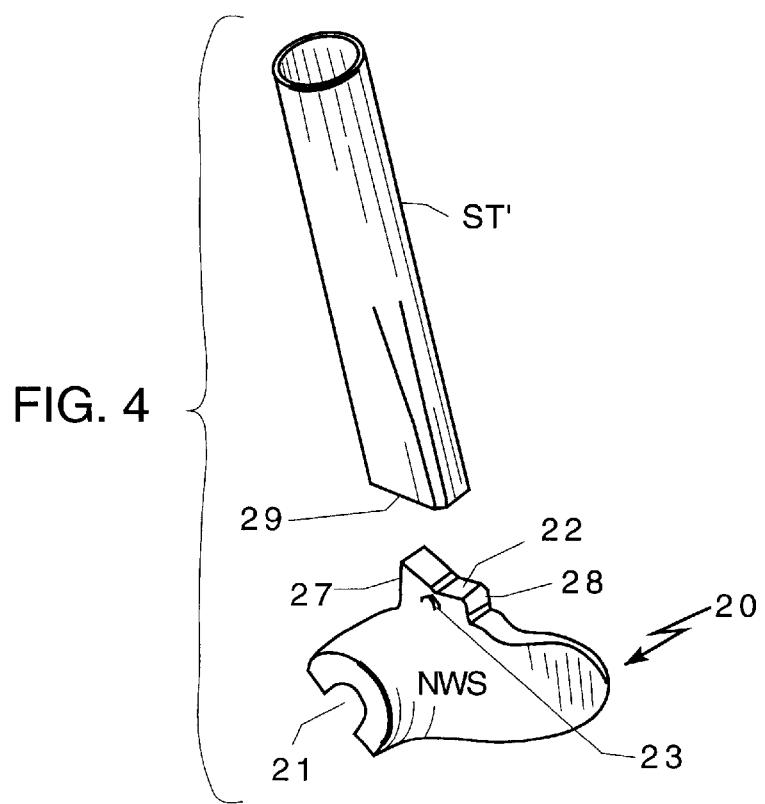
FIG. 4 is an isometric view of a preferred embodiment of a dropout incorporating the invention.

Referring now to FIGS. 4–6, a dropout 20 having an open slot 21 for receiving one end of a rear wheel axle, a generally rectangular projecting seatstay projection 22 having a centrally located pivot pin 23 projecting perpendicularly outwardly on the wheel side of dropout. The non-wheel side NWS is adapted to have the rear end of a chainstay tube adapted to be welded, brazed or glued to the non-wheel thereto. Pivot pin 23 is centrally located between arcuate ends 27, 28 and prevents the lower edge 29 of the seatstay tube from telescoping too far down on the seatstay projection 22. While the lower end of the seatstay tube may be provided with a slot, in this embodiment this is not necessary. Dropout 20 may have bored and tapped holes for attachment of gearshift mechanism, rack, etc. and be formed with holes for weight reduction purposes (not shown).

Figure 5A:
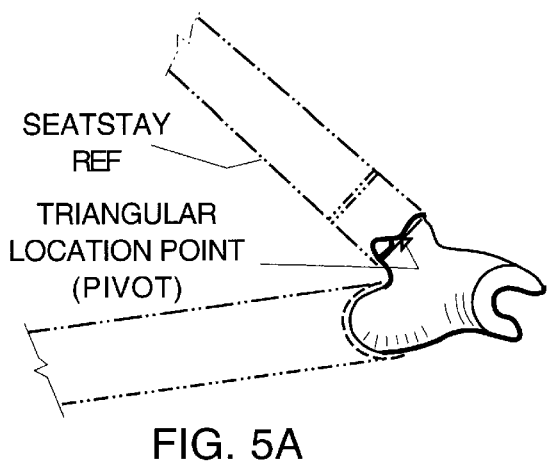
FIG. 5A is a side elevational view of a small framed portion of a rear triangle incorporating the invention.
Figure 5B:
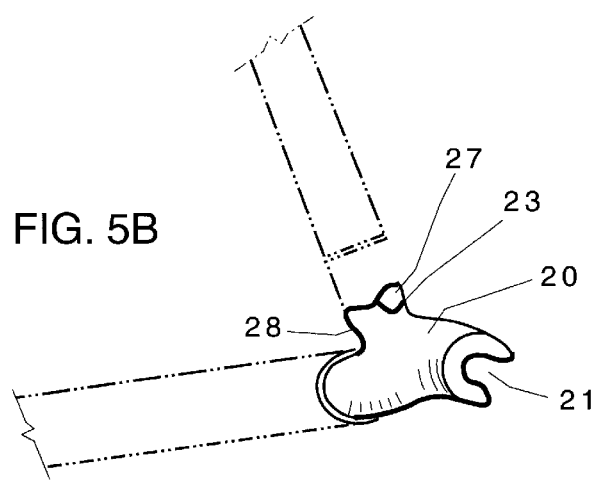
FIG. 5B is a side elevational view of a large frame bicycle incorporating the invention.
Figure 6A:
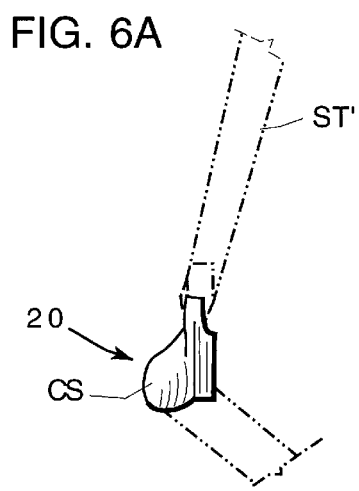
FIG. 6A is a rear view of a small frame bicycle incorporating the dropout of this invention.
Figure 6B:
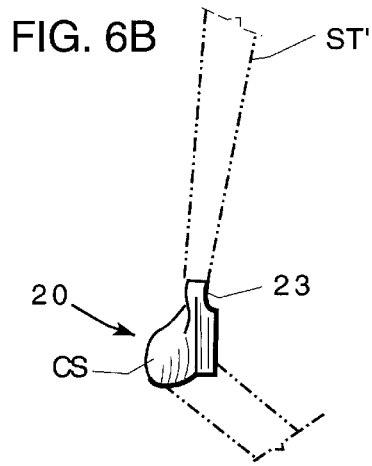
FIG. 6B is a rear view of a large frame bicycle incorporating the dropout of this invention.

As shown in FIGS. 5A and 5B, the seatstay tube ST is rotated on pivot pin 23 in fore and aft directions for different frame sizes, from a small size shown in FIG. 5A to a large sized frame. Moreover, with the lower edge of seatstay tube ST engaged on the pivot pin 23, it can be rotated outwardly or inwardly as shown in the rear views of FIGS. 6A and 6B to accommodate small and large bicycle frames, respectively.

Figure 7:
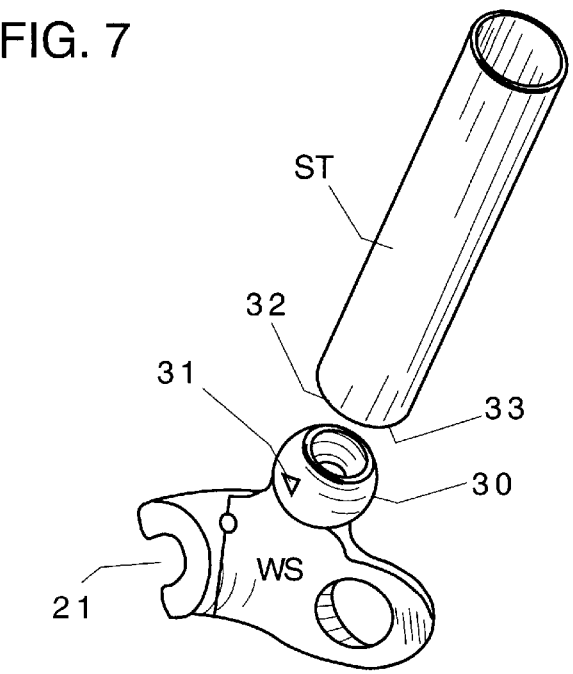
FIG. 7 is a perspective view of a further embodiment of the invention.
Figure 8:
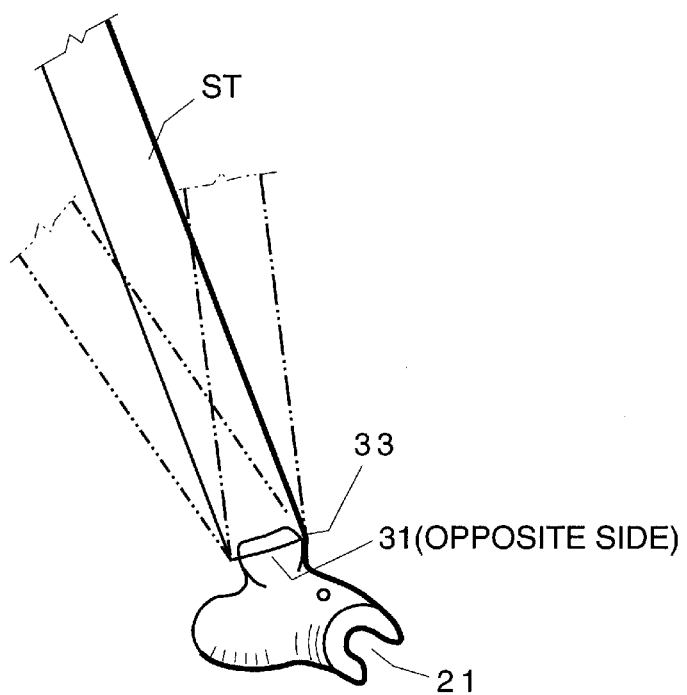
FIG. 8 is a side view illustrating a range of adjustments for the dropout illustrated in FIG. 7.

Referring now to FIGS. 7 and 8, the seatstay projection 30 in this embodiment is generally spherical with pivot pin 31 laterally projecting perpendicularly on the wheel side WS of the dropout 29. In this embodiment a pivot pin notch 32 is formed on the lower edge 33 of seatstay tube $ST^1$. The dropout 29 will locate the lower edge 33 of the seatstay $ST^1$ using the internal diameter ID of the tube (straight or formed) to the dropout's outer ball projection 30 using pivot pin 31 to prevent the seatstay from slipping over center. By notching the end of the a straight (not formed) seatstay, the pivot pin 31 will act as a positive locator for the tube $ST^1$ ensuring an accurate fit-up with the seat tube. This is not accomplished by any of the prior art designs. The dropout will have approximately 170° of engagement which inherently provides a much more stable interface. With a locator pivot pin 31 preventing the seatstay tube $ST^1$ (with or without a formed end) from dropping over center of the ball, an easy and accurate fit will result for the assembler.

The invention can be modified to accommodate brazing, gluing and other means of bonding, which clearly cannot be done with the prior art designs due to the small amount of surface contact between mating pieces.

I claim:

1. A bicycle rear wheel dropout assembly, said bicycle having chainstay and seatstay tubes, comprising a wheel dropout body member having a wheel axle receiving slot, a surface for securement of the rear end of said bicycle chainstay, and a seatstay projections a pivot pin projecting laterally from the wheel side of said seatstay projection, said seatstay tube having a lower edge, and means permanently securing said seatstay tube on said projection with said lower edge in engagement with said pivot pin in a predetermined angular orientation for a given bicycle size.

2. The bicycle rear wheel dropout assembly defined in claim 1 wherein said seatstay projection is rectangular in cross section.

3. The bicycle rear wheel dropout assembly defined in claim 1 wherein said seatstay projection is spherically shaped and said lower edge of said seat tube having a pivot pin notch with said pivot pin seated in said notch.

4. A method of accurately orienting and securely attaching a bicycle seatstay to a wheel dropout, said seatstay having a lower edge comprising:

(a) forming a pin notch in the lower edge of said seatstay, (b) forming a pivot pin on a seatstay projection on said wheel dropout, (c) positioning said pivot pin in said pin notch and rotatably orienting said seat stay relative to said pivot pin, while said pivot pin is maintained engaged in said pin notch, to the desired angular orientation of said seatstay and said wheel dropout, and (d) permanently securing said seatstay to said seatstay projection.

5. The method of accurately orienting and securely attaching a bicycle seatstay to a wheel dropout as defined in claim 4 wherein said wheel dropout has a wheel side and a non-wheel side and said pivot pin is on said wheel side of said dropout.

6. The method of accurately orienting and securely attaching a bicycle seatstay to a wheel dropout as defined in claim 4 wherein said wherein said pin notch is on a diameter of said seatstay tube.

7. A bicycle rear wheel dropout assembly, said bicycle having chainstay and seatstay tubes comprising a wheel dropout body member having a wheel axle receiving slot, a surface for securement of the rear end of one of said bicycle chainstay, and a seatstay projection a pivot pin projecting laterally from the wheel side of said seatstay projection, a pivot pin notch formed in the lower edge of said seatstay tube, and means permanently securing said seatstay tube on said projection in a predetermined angular orientation for a given bicycle size.

8. The bicycle rear wheel dropout assembly defined in claim 7 wherein said seatstay projection is rectangular in cross section.

9. The bicycle rear wheel dropout assembly defined in claim 7 wherein said seatstay projection is spherically shaped.

* * * * *